June 4, 1946.　　　　R. O. BURGESS　　　　2,401,609
INSTRUMENT FOR MEASURING VERTICAL ANGLES
Filed Oct. 16, 1942　　　3 Sheets-Sheet 3
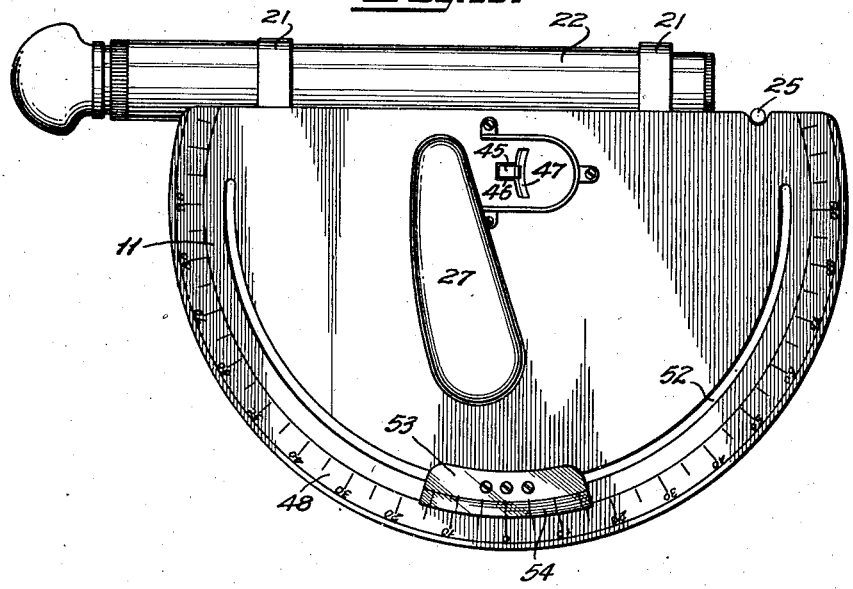
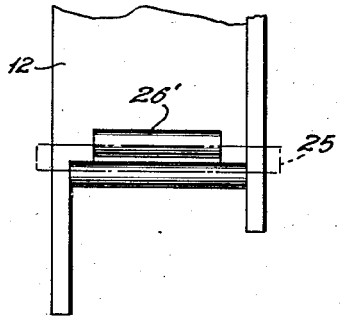
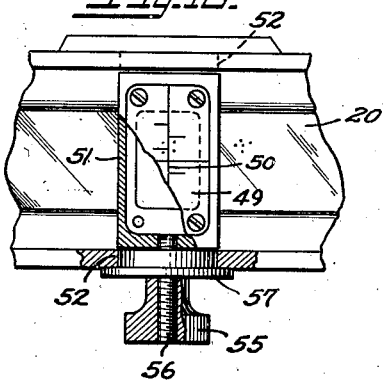
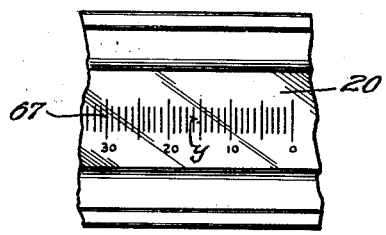
INVENTOR.
Robert O. Burgess,
BY
ATTORNEYS.

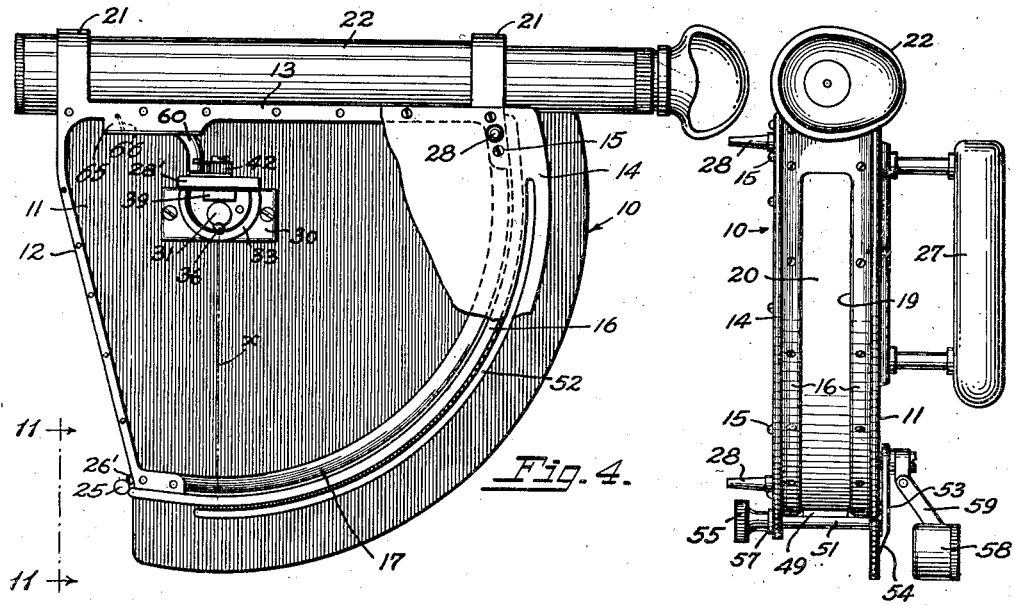
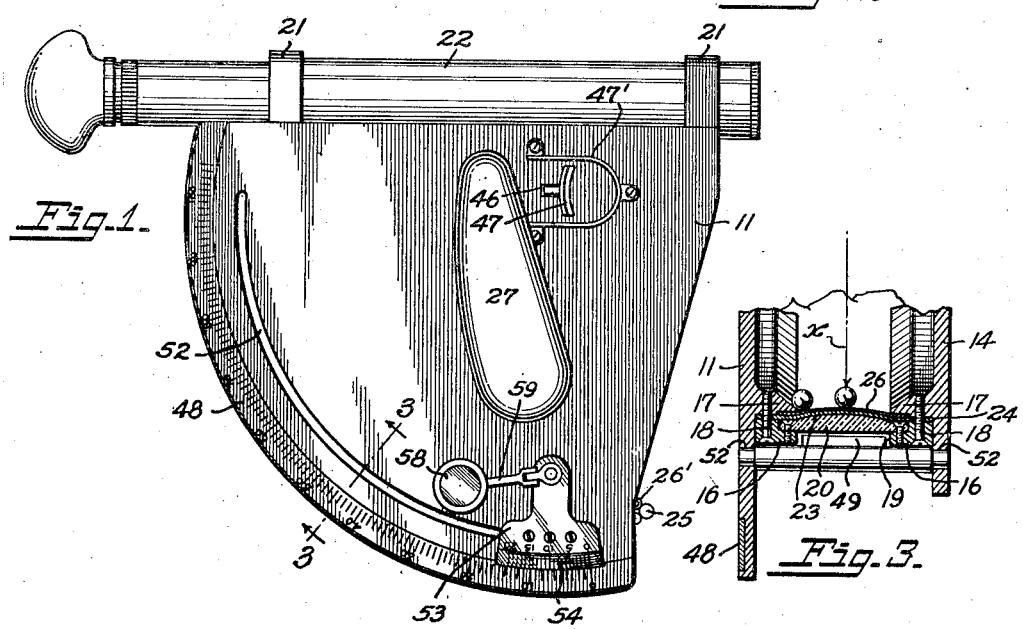

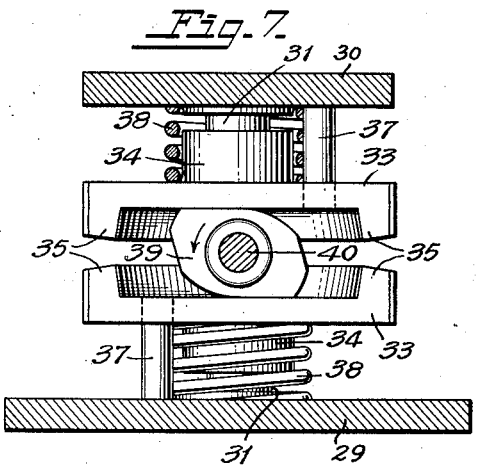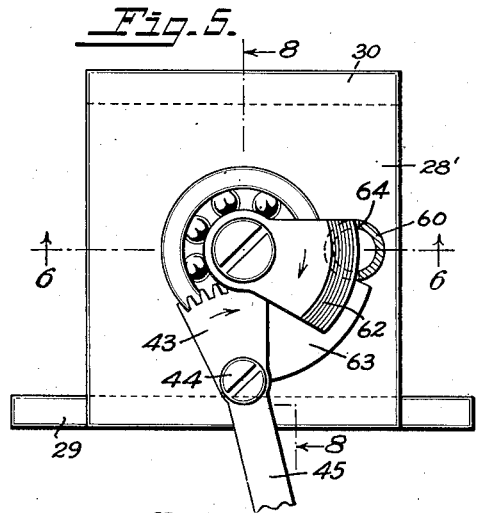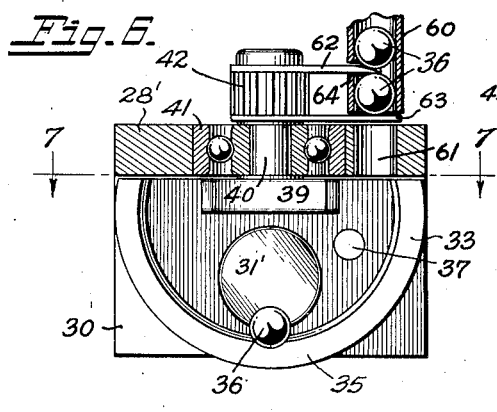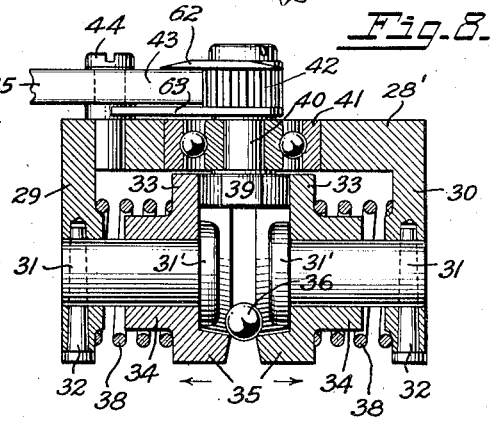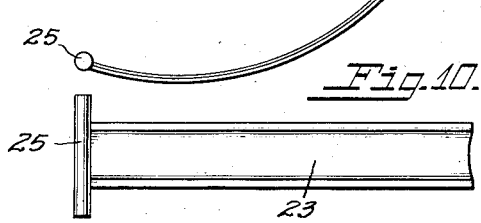

Patented June 4, 1946

2,401,609

UNITED STATES PATENT OFFICE 2,401,609

INSTRUMENT FOR MEASURING VERTICAL ANGLES

Robert O. Burgess, Arlington, Va.

Application October 16, 1942, Serial No. 462,315

13 Claims. (Cl. 33—70)

(Granted under the act of March 3, 1883, as amended April 30, 1928; 370 O. G. 757)

This invention relates to instruments for measuring vertical angles and it has a particular relation to instruments for determining angles subtended at an observer's position by distant objects and especially for use at sea or in aircraft in measuring the altitudes of celestial bodies. A sextant is one example of such an instrument.

One of the objects of the present invention is the provision of an instrument of the character described in which the use of the actual horizon or a bubble or artificial horizon is unnecessary in accurately measuring the altitude of a celestial body, which factor is of particular advantage when an observation is taken at night or when the horizon is otherwise obscured, such as by fog or low lying clouds.

Another object of the invention is the provision of an instrument of the sextant type, in which no lenses, mirrors, or other optical means are employed, thus eliminating the necessity of bringing the image of the reference object to the horizon and the complicated adjustments incidental thereto.

A further object of the invention is the provision of an instrument of the type indicated by means of which a series of observations of the same or different celestial bodies or other objects may be made in rapid succession and recorded for subsequent averaging and in which such recordations may quickly and easily be effaced to enable the observations to be repeated.

Another object of the invention is the provision of an instrument of the sextant type in which the usual index arm or pendulum is eliminated thus removing any possibility of eccentric error.

Still another object of the invention is the provision of an instrument of the type described in which collimation, that is to say, the initial adjustment of the zero point of the scale with respect to the center line of the sighting means, is materially simplified.

A further object of the invention is the provision of a precision instrument of simple and rugged design which will lend itself readily to mass production without sacrificing accuracy and which may be constructed of metal or plastic material, which is of great importance in view of the extremely large demand created by the present emergency for both marine and aviation use and the large percentage of battle loss.

A still further object of the invention is the provision of an instrument which may be employed in aerial as well as marine navigation wherein, due to the speed of the aircraft, observations must be made with the least possible loss of time.

With these and other objects in view, as well as other advantages that may be incident to the use of the improvements or which will become obvious as the following description proceeds, the invention consists in the parts and combinations thereof hereinafter set forth and claimed, with the understanding that the several necessary elements constituting the same may be varied in proportion and arrangement without departing from the nature and scope of the invention, as defined in the appended claims.

In order, however, to make the invention more clearly understood, there are shown in the accompanying drawings, means for carrying the invention into practical use, without limiting the improvements in their useful application to the particular construction, which for the purpose of explanation, have been made the subject of illustration.

In said drawings:

Fig. 1 is a side elevational view of an instrument for measuring vertical angles constructed in accordance with the present invention;

Fig. 2 is an edge elevational view of the structure shown in Fig. 1;

Fig. 3 is a fragmentary vertical longitudinal sectional view on a larger scale taken on line 3—3 of Fig. 1;

Fig. 4 is an elevational view of the side of the instrument opposite to that illustrated in Fig. 1, with the cover plate partly broken away so as to show the interior of the instrument;

Fig. 5 is an enlarged top plan view of the ball releasing mechanism;

Fig. 6 is a vertical longitudinal sectional view taken on line 6—6 of Fig. 5;

Fig. 7 is a horizontal sectional view taken on line 7—7 of Fig. 6;

Fig. 8 is a vertical sectional view taken on line 8—8 of Fig. 6;

Fig. 9 is a detail side elevational view of the flexible plastic platen;

Fig. 10 is a plan view of the platen shown in Fig. 9;

Fig. 11 is an enlarged fragmentary edge view of the structure showing the slot for receiving the removable platen and indicated by the line 11—11 in Fig. 4;

Fig. 12 is an enlarged fragmentary view partly in plan and partly in section of the adjustable reading glass for indicating the position of the impression on the platen relative to the scale;

Fig. 13 is a side elevational view of an instrument embodying the invention but which is operable through an arc of 180° and adapted for use not only on shipboard but for use in aircraft in sighting objects below the horizontal; and Fig. 14 is an enlarged fragmentary edge view of an instrument in which a graduated index scale is etched upon the window in the arcuate wall of the housing so that the impressions made by the ball on the platen will appear directly back of the scale.

Referring to the drawings, an instrument embodying the present invention is shown as comprising an arcuate housing or casing 10 having a side wall 11, integral top and front walls 12 and 13 respectively, and a removable cover plate 14 which constitutes the other side wall of the housing and which is secured to the front and top walls 12 and 13 by screws 15. An arcuate rear and bottom wall 16 is secured to arcuate flanges 17 (Fig. 3) formed on the side wall 11 and cover plate 14 by means of screws 18 and is provided with an opening 19 throughout substantially its entire length (Fig. 3), which is closed by a transparent strip 20 of glass or plastic having an upwardly convexed surface and which forms a window for purposes presently to be described. Front and rear rings or bands 21 are provided on the top wall 13 and are adapted to have a sighting device 22 of any preferred type removably mounted therein. A flexible transparent strip forming a platen 23 is removably superimposed over the glass window 20 with its side edges lying in grooves 24 formed in the flanges 17 and conforms to the curvature of the glass 20. A knob or handle 25 is provided on one end of the platen 23 by means of which it may be quickly inserted over the glass or removed from the housing 10. A strip of marking material 26 such as carbon paper or the like, is clamped at its end to the platen 23 by means of clips 26' with its impression making surface in contact with the platen. A handle 27 is provided on the side wall 11 of the housing by means of which the instrument may be manipulated and a plurality of legs or pins 28 are provided on the cover plate 14 for supporting the instrument when it is not in use. The mechanism just described constitutes the recording means of the instrument and is adapted to receive an impression when a ball released by the mechanism located in the center of the housing 10 impinges thereon.

This ball release mechanism comprises a support in the form of a casting having a top wall 28' and side flanges 29 and 30, the former being secured to the side wall 11 of the housing 10. A pair of inwardly extending post members 31, having heads 31' formed on their inner ends, are fixed in the side flanges 29 and 30 in spaced axial alignment by pins 32 and slidably support two opposed semicircular members 33 each of which is formed with a hub portion 34 and an arcuate flange 35 having a knife edge of hardened steel. The edges of the flanges 35 are spaced from one another and together form rails disposed concentric with the impression means for supporting a missile in the form of a steel ball 36, as shown in Fig. 8. The members 33 are prevented from rotating on the posts 31 by guide pins 37 fixed in the flanges 29 and 30 and are urged towards one another by springs 38 surrounding the posts 31 and hubs 34 between the members 33 and the side flanges 29 and 30. The edges of the flanges 35 are spaced apart a distance less than the diameter of the ball 36, so that the ball cannot pass therebetween until the members 33 are separated. The ball, however, is free to roll around the rails when the instrument is tilted, as is the case when an observation is taken, so that the ball 36 will always assume a position in line with the vertical.

When it is desired to release the ball at the moment a sight is obtained upon a celestial body or other reference object, the members 33 are separated against the action of the springs 38 by means of a double faced cam 39 which engages the inner faces of the members 33. This cam together with the heads 31' on the posts 31 maintain the members 33 in the proper spaced relation during the sighting operation. This cam is fixed to the lower end of a stud shaft 40 which is journaled in a bearing 41 mounted in the top wall 28' of the casting. The shaft 40 and cam 39 are rotated through the medium of a pinion 42 which is fixed to the upper end of the shaft 40 and which is engageable by a segmental rack 43 (Fig. 5) pivotally mounted by a screw 44 to the top wall 28' of the casting. The rack is turned by means of a lever arm 45 fixed thereto and extends outwardly through a slot 46 (Fig. 1) formed in the side wall 11 of the housing 10 and is provided with a trigger or finger piece 47 in convenient position with respect to the handle 27. The trigger piece 47 is protected by a guard 47' secured to the side wall 11.

From the foregoing it will be apparent that when a sight is obtained upon a reference object, say the sun in the day time or some particular star at night, the trigger piece 47 is pulled thus rotating the lever 45 and rack 43 about the screw 44 thereby rotating the pinion 42, shaft 40 and cam 39 mounted thereon. The force thus exerted by the cam 39 urges the members 33 apart against the action of the springs 38, so as to permit the ball 36 to drop downwardly therebetween in a true vertical path indicate at "X" in Figs. 3 and 4, and impinge upon the marking strip 26. This will cause an impression to be made upon the transparent platen 23 which will be visible through the glass window 20.

The instrument is provided with a scale 48, graduated in degrees and minutes, which is preferably formed of a separate arcuate strip inlaid in the lower edge of the side wall 11. In order, therefore, to align the impression made by the ball on the platen 23 a movable reading glass 49 is provided having a hair line 50 inscribed thereon. This glass is mounted in a frame 51 the edges of which are slidably mounted in arcuate slots 52 provided in the side wall 11 and cover plate 14 and has secured thereto, at its outer edges, a guide plate 53 having a vernier scale 54 thereon. After an observation has been taken and the ball 36 is released, the glass 49 is slid around the arcuate edge of the instrument manually until the hair line 50 intersects the impression on the platen 23. In this position the vernier scale 54 will indicate on the scale 48 the angle between the line of sight and the vertical path of fall "X" of the ball 36. The scale 48 may be calibrated to show the angle between the line of sight and the horizontal which is the angle between the line of sight and the vertical, less 90°. As soon as the glass 49 has been moved to the proper position it may be clamped therein as against accidental displacement by a thumb nut 55 which is threaded on a screw 56 carried by the frame 51 and which bears against a washer 57 interposed between the nut and the side of the cover plate 14.

After an observation has been taken and the angle of sight noted, the platen 23 may be withdrawn from the instrument and the impression or impressions wiped off, after which the platen may be reinserted for future use. The reading of the vernier scale and index scale 48 may be facilitated by a magnifying glass 58 carried by an arm 59 pivotally mounted on the plate 53.

It is frequently desirable that several observations be taken of the same or different reference objects so that an average reading may be obtained. With this end in view the instrument is provided with a tubular magazine 60 adapted to contain a plurality of the balls 36. This magazine is fixed to the top wall 13 of the housing and curves downwardly with its lower end in registry with an opening 61 formed in the top wall 28' of the casting and in line with the space between the members 33 (Figs. 4 and 6). These balls are supported and are successively released by upper and lower arcuate fingers 62 and 63 which are fixed to the shaft 40 in vertically spaced angularly offset relation. The upper finger 62 extends into a slot 64 formed in the magazine 60 and supports several of the balls 36, and the lower finger 63 extends under the lower end of the magazine above the opening 61 and supports a single ball. When the shaft 40 is rotated to release a ball from between the members 33, as previously described, the finger 62 rotates in a counter-clockwise direction, as viewed in Fig. 5 and is of sufficient width to remain under the balls in the upper end of the magazine 60 and support the same. However, toward the end of the stroke of the trigger 47 and parts actuated thereby, the finger 62 passes out of the slot 64 in the magazine permitting the balls therein to drop onto the lower finger 63 which by this time has moved beneath the magazine. Upon the return stroke of the parts, the finger 62 passes between the lowermost ball in the magazine and those thereabove supporting the latter and at the end of the stroke the lower finger passes from beneath the magazine and permits the lowermost ball to drop into position between the members 33 for the next succeeding observation. When the balls are released from between the members 33 and drop onto the recording means the convexed surface thereof causes them to roll laterally to one side or the other and out of the path of fall of the succeeding ball.

After one or more of the balls have been released they may be returned to the magazine by inverting the instrument so that they will roll around the arcuate wall 16 and straight forward wall 12 and be guided back into the magazine by converging flanges 65 on the upper wall 13 of the housing, where any reverse movement therefrom is prevented by a one-way gate device 66.

It may be found desirable to dispense with the index scale 48 on the side wall 11 of the housing and also with the movable reading glass 49 and provide in lieu thereof a corresponding scale 67 directly on the glass window 20 by etching, or the like (Fig. 14). In such event the impression or pattern of the impressions "Y" appearing upon the contiguous platen will be directly in line with the scale 67 for a direct reading without resorting to the movable reading glass and hair line.

It will be understood that the above description and accompanying drawings comprehend only the general and preferred embodiment of the invention, and that various changes in the construction, proportion and arrangement of the parts other than those herein described may be made within the scope of the appended claims without sacrificing any of the advantages of the invention.

The invention described herein may be manufactured and used by or for the Government of the United States of America for governmental purposes without the payment of any royalties thereon or therefor.

What is claimed is:

1. An instrument for measuring vertical angles comprising a frame, sighting means carried by said frame adapted to be trained upon a distant object, arcuate recording means carried by said frame, means for supporting a missile for free movement under the influence of gravity in an arcuate path concentric with said recording means, a scale carried by said frame concentric with said recording means, means for releasing said missile from said support when a sight has been taken to permit it to fall in a vertical path and produce an impression on said recording means through impact therewith, and means mounted on said frame and movable relative to said scale to indicate the position of said impression relative thereto and the angle between the line of sight of said sighting means and the path of fall of said missile when released.

2. An instrument for measuring vertical angles comprising a frame, sighting means carried by said frame adapted to be trained upon a distant object, arcuate recording means carried by said frame, an arcuate track mounted concentric with said recording means for supporting a missile for free movement thereon under the influence of gravity, a scale carried by said frame concentric with said recording means, means for releasing said missile from said support when a sight has been taken to permit it to fall in a vertical path and produce an impression on said recording means through impact therewith, and means mounted on said frame and movable relative to said scale to indicate the position of said impression relative thereto and the angle between the line of sight of said sighting means and the path of fall of said missile when released.

3. An instrument for measuring vertical angles comprising a frame, sighting means carried by said frame adapted to be trained upon a distant object, arcuate recording means carried by said frame, an arcuate track mounted concentric with said recording means for supporting a ball for free rolling movement thereon under the influence of gravity, a scale carried by said frame concentric with said recording means, means for releasing said ball from said track when a sight has been taken to permit it to fall in a vertical path and produce an impression on said recording means through impact therewith, and means mounted on said frame and movable relative to said scale to indicate the position of said impression relative thereto and the angle between the line of sight of said sighting means and the path of fall of said ball when released.

4. An instrument for measuring vertical angles comprising a frame, sighting means carried by said frame adapted to be trained upon a distant object, arcuate recording means carried by said frame, a pair of parallel arcuate rails mounted concentric with said recording means for supporting a ball for free rolling movement thereon under the influence of gravity, a scale carried by said frame concentric with said recording means, means for separating said rails when a sight has been taken to permit said ball to pass downwardly therebetween and to fall in a vertical path and produce an impression on said recording means through impact therewith, and means mounted on said frame and movable relative to said scale to indicate the position of said impression relative thereto and the angle between the line of sight of said sighting means and the path of fall of said ball when released.

5. An instrument for measuring vertical angles comprising a frame, sighting means carried by said frame adapted to be trained upon a distant object, arcuate recording means carried by said frame, a pair of arcuate rails mounted concentric with said recording means in side-by-side relation for supporting a ball for free rolling movement thereon under the influence of gravity, a scale carried by said frame concentric with said recording means, manually operated cam means for separating said rails when a sight has been taken to permit said ball to pass downwardly therebetween and to fall in a vertical path and produce an impression on said recording means through impact therewith, and means mounted on said frame and movable relative to said scale to indicate the position of said impression relative thereto and the angle between the line of sight of said sighting means and the path of fall of said ball when released.

6. An instrument for measuring vertical angles comprising a frame, sighting means carried by said frame adapted to be trained upon a distant object, arcuate recording means carried by said frame, a pair of arcuate rails mounted concentric with said recording means in side-by-side relation for supporting a ball for free rolling movement thereon under the influence of gravity, a scale carried by said frame concentric with said recording means, spring means for urging said rails towards one another, manually operable cam means for separating said rails against the action of said spring means when a sight has been taken to permit said ball to pass downwardly therebetween and to fall in a vertical path and produce an impression on said recording means through impact therewith, and means mounted on said frame and movable relative to said scale to indicate the position of said impression relative thereto and the angle between the line of sight of said sighting means and the path of fall of said ball when released.

7. An instrument for measuring vertical angles comprising a frame, sighting means carried by said frame adapted to be trained upon a distant object, arcuate recording means carried by said frame, an arcuate track mounted concentric with said recording means for supporting a ball for free rolling movement thereon under the influence of gravity, a magazine for containing a plurality of balls to be separately supplied to said track for successive observations, a scale carried by said frame concentric with said recording means, means for releasing said ball from said track when a sight has been taken to permit it to fall in a vertical path and produce an impression on said recording means through impact therewith, and means mounted on said frame and movable relative to said scale to indicate the position of said impression relative thereto and the angle between the line of sight of said sighting means and the path of fall of said ball when released, said recording means having an upwardly convexed surface adapted to deflect said ball laterally out of line with the path of fall of a succeeding ball when such ball is later released from said track.

8. An instrument for measuring vertical angles comprising a housing, sighting means carried by said housing adapted to be trained upon a distant object, arcuate recording means carried by said housing, means for supporting a missile for free movement under the influence of gravity in an arcuate path concentric with said recording means, a scale carried by said housing concentric with said recording means, means for releasing said missile from said support when a sight has been taken to permit it to fall in a vertical path and produce an impression on said recording means through impact therewith, and means mounted on said housing and movable relative to said scale to indicate the position of said impression relative thereto and the angle between the line of sight of said sighting means and the path of fall of said missile when released, said housing being adapted to confine said missile and to provide a static environment therefor during its fall.

9. An instrument for measuring vertical angles comprising a frame, sighting means carried by said frame adapted to be trained upon a distant object, arcuate recording means carried by said frame, an arcuate track mounted concentric with said recording means for supporting a ball for free rolling movement thereon under the influence of gravity, a magazine for containing a plurality of balls to be supplied to said track, a scale carried by said frame concentric with said recording means, means for releasing a ball from said track when a sight has been taken to permit it to fall in a vertical path and produce an impression on said recording means through impact therewith and for supplying another ball to said track for a subsequent observation, and means mounted on said frame and movable relative to said scale to indicate the position of said impression relative thereto and the angle between the line of sight of said sighting means and the path of fall of the ball when released.

10. An instrument for measuring vertical angles comprising a frame, sighting means carried by said frame adapted to be trained upon a distant object, arcuate recording means carried by said frame, a pair of parallel arcuate rails mounted concentric with said recording means for supporting a ball for free rolling movement thereon under the influence of gravity, a magazine for containing a plurality of balls to be supplied to said rails, a scale carried by said frame concentric with said recording means, means for separating said rails when a sight has been taken to permit a ball to pass downwardly therebetween and to fall in a vertical path and produce an impression on said recording means through impact therewith and for supplying another ball to said rails for a subsequent observation, means mounted on said frame and movable relative to said scale to indicate the position of said impression relative thereto and the angle between the line of sight of said sighting means and the path of fall of said ball when released, and means for returning said balls to said magazine when the observations are completed.

11. An instrument for measuring vertical angles comprising an arcuate housing, sighting means carried by said housing adapted to be trained upon a distant object, a window in the arcuate side of said housing, a transparent flexible platen removably mounted adjacent said window interiorly thereof, marking means mounted on said platen, means for supporting a missile for free movement under the influence of gravity in an arcuate path concentric with said marking means, a scale carried by said housing concentric with said window, means for releasing said missile from said support when a sight has been taken to permit it to fall in a vertical path and strike said marking means to produce an impression on said platen visible through said window, and means mounted on said housing and movable relative to said scale to indicate the position of said impression relative thereto and the angle between the line of sight of said sighting means and the path of fall of said missile when released.

12. An instrument for measuring vertical angles comprising a frame, sighting means carried by said frame adapted to be trained upon a distant object, arcuate recording means carried by said frame, an arcuate track mounted concentric with said recording means for supporting a ball for free rolling movement thereon under the influence of gravity, a scale carried by said frame adjacent to and concentric with said recording means, means for releasing said ball from said support when a sight has been taken to permit it to fall in a vertical path and produce an impression on said recording means through impact therewith, the position of said impression relative to said scale indicating the angle between the line of sight of said sighting means and the path of fall of said ball when released.

13. In an instrument for measuring vertical angles including a frame, sighting means carried by said frame, adapted to be trained upon a distant object and arcuate recording means carried by said frame, the combination with said recording means, of means for supporting a missile for free movement under the influence of gravity in an arcuate path concentric with said recording means, and means for releasing said missile from said supporting means when a sight has been taken to permit it to fall in a vertical path and produce an impression on said recording means through impact therewith.

ROBERT O. BURGESS.